(12) United States Patent
Lee

(10) Patent No.: US 11,182,028 B2
(45) Date of Patent: Nov. 23, 2021

(54) SENSING COIL COMPONENT AND SWITCHING OPERATION SENSING DEVICE INCLUDING THE SAME

(71) Applicant: Samsung Electro-Mechanics Co., Ltd., Suwon-si (KR)

(72) Inventor: Joo Hyoung Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 24 days.

(21) Appl. No.: 16/829,526

(22) Filed: Mar. 25, 2020

(65) Prior Publication Data

US 2021/0181873 A1 Jun. 17, 2021

(30) Foreign Application Priority Data

Dec. 17, 2019 (KR) ........................ 10-2019-0168648

(51) Int. Cl.
*G06F 3/044* (2006.01)
*G01D 5/20* (2006.01)

(52) U.S. Cl.
CPC ........... *G06F 3/044* (2013.01); *G01D 5/2066* (2013.01)

(58) Field of Classification Search
CPC .............................. G06F 3/044; G01D 5/2066
USPC .......................................... 345/174; 324/236
See application file for complete search history.

(56) References Cited

U.S. PATENT DOCUMENTS

| 4,678,994 A * | 7/1987 | Davies ..................... G07D 5/08 |
| | | 324/236 |
| 11,057,036 B2 * | 7/2021 | Ji ........................... G06F 3/0416 |
| 2014/0132529 A1 * | 5/2014 | Jeong .................. G06F 3/03545 |
| | | 345/173 |
| 2015/0130649 A1 | 5/2015 | Itakura et al. |
| 2016/0291785 A1 * | 10/2016 | Mizuhashi ............ G06F 3/0412 |
| 2017/0075429 A1 * | 3/2017 | Bromer ................... G06F 3/017 |
| 2018/0067590 A1 * | 3/2018 | Wang ..................... G06F 3/0412 |
| 2018/0093695 A1 | 4/2018 | Hattori et al. |

(Continued)

FOREIGN PATENT DOCUMENTS

| JP | 2008-40835 A | 2/2008 |
| JP | 2012-168747 A | 9/2012 |

(Continued)

OTHER PUBLICATIONS

Korean Office Action dated May 28, 2021 in Counterpart Korean Application No. 10-2019-0168648 (6 pages in English and 4 pages in Korean).

*Primary Examiner* — Prabodh M Dharia
(74) *Attorney, Agent, or Firm* — NSIP Law

(57) ABSTRACT

A switching operation sensing device to be applied to an electronic device including a touch operation unit having a first touch member integrated with a housing, the switching operation sensing device including a sensing coil component including a first inductor unit disposed on an inner surface of the first touch member, and an oscillator circuit connected to the sensing coil component and configured to generate an oscillation signal having a resonant frequency that changes when a touch operation is input through the touch operation unit, wherein the first inductor unit includes a first sensing area opposing the first touch member, a first sensing wiring disposed in the first sensing area, and a first sensing coil connected between the first sensing wiring and a first resonant circuit of the oscillator circuit.

18 Claims, 10 Drawing Sheets

(56) References Cited

U.S. PATENT DOCUMENTS

2018/0120364 A1    5/2018  Lee et al.
2018/0139323 A1    5/2018  Kim et al.
2019/0101417 A1*   4/2019  Patel ...................... G01D 5/245

FOREIGN PATENT DOCUMENTS

| JP | 2015-95865 A | 5/2015 |
| KR | 2002-0077836 A | 10/2002 |
| KR | 10-2009-0120709 A | 11/2009 |
| KR | 10-2011-0049975 A | 5/2011 |
| KR | 10-2011-0087004 A | 8/2011 |
| KR | 10-2011-0087014 A | 8/2011 |
| KR | 10-2016-0143029 A | 12/2016 |
| KR | 10-2017-0084873 A | 7/2017 |
| KR | 10-2018-0046833 A | 5/2018 |

\* cited by examiner

SENSING COIL COMPONENT AND SWITCHING OPERATION SENSING DEVICE INCLUDING THE SAME

CROSS-REFERENCE TO RELATED APPLICATIONS

This application claims the benefit under USC 119(a) of Korean Patent Application No. 10-2019-0168648 filed on Dec. 17, 2019, in the Korean Intellectual Property Office, the entire disclosure of which is incorporated herein by reference for all purposes.

BACKGROUND

1. Field

The present disclosure relates to a sensing coil component and a switching operation sensing device including the same.

2. Description of the Background

Generally, a thin wearable device with a simplified design has been preferred, and a general mechanical switch has disappeared from a wearable device. This change has been possible by implementing a water-proof technique and a dust-proof technique and developing a device model with a smooth and integrated design.

Currently, techniques such as a touch-on-metal technique of touching a metal, a capacitor sensing method using a touch panel, a micro-electro-mechanical-system (MEMS), a micro strain gauge, and the like, have been developed, and also, a force-touching function has been developed.

As for a general mechanical switch, a relatively large size and amount of space may be required internally to implement a switch function, and due to an externally protruding design, a structure in which a switch is not integrated with an external case, or the like, a mechanical switch may have an obtrusive design and may require a large space.

Also, there may be a risk of an electric shock for a direct contact with an electrically connected mechanical switch, and the dust-proofing and water-proofing of a mechanical switch may be difficult due to a structural aspect of a mechanical switch. Although various methods for performing a button function without a button for such a function as described above have been suggested, excessive noise suppression may be necessary to increase sensing ability.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a switching operation sensing device to be applied to an electronic device having a touch operation unit having a first touch member integrated with a housing, the switching operation sensing device including a sensing coil component including a first inductor unit disposed on an inner surface of the first touch member, and an oscillator circuit connected to the sensing coil component and configured to generate an oscillation signal having a resonant frequency that changes when a touch operation is input through the touch operation unit, wherein the first inductor unit includes a first sensing area opposing the first touch member, a first sensing wiring disposed in the first sensing area, and a first sensing coil connected between the first sensing wiring and a first resonant circuit of the oscillator circuit.

The sensing coil component may further include second and third inductor units disposed adjacent to the first inductor unit, wherein the second inductor unit may include a second sensing area opposing a second touch member disposed in the housing, a second sensing wiring disposed in the second sensing area, and a second sensing coil connected between the second sensing wiring and a second resonant circuit of the oscillator circuit, and wherein the third inductor unit may include a third sensing area opposing a third touch member disposed in a different position of the housing from the second sensing area, a third sensing wiring disposed in the third sensing area, and a third sensing coil connected between the third sensing wiring and a third resonant circuit of the oscillator circuit.

The sensing coil component may further include a second inductor unit disposed adjacent to the first inductor unit, and the second inductor unit may include a second sensing area opposing a second touch member disposed in the housing, a second sensing wiring disposed in the second sensing area, a second sensing coil connected between the second sensing wiring and a second resonant circuit of the oscillator circuit, and a first sensing extension wiring disposed in the second sensing area, and connected between the first sensing wiring and the first resonant circuit.

The sensing coil component may further include a third inductor unit disposed adjacent to the second inductor unit, wherein the third inductor unit may include a third sensing area opposing a third touch member disposed in the housing, a third sensing wiring disposed in the third sensing area, a third sensing coil connected between the third sensing wiring and a third resonant circuit of the oscillator circuit, the first sensing extension wiring disposed in the third sensing area, and a second sensing extension wiring disposed in the third sensing area and connected between the second sensing wiring and the second resonant circuit.

The sensing coil component may further include a third inductor unit disposed adjacent to the second inductor unit, wherein the third inductor unit may include a third sensing area opposing a third touch member disposed in the housing, and the first sensing extension wiring disposed in the third sensing area.

The sensing coil component may further include a third inductor unit disposed between the first inductor unit and the second inductor unit, wherein the third inductor unit may include a third sensing area opposing a third touch member disposed in the housing, the first sensing extension wiring disposed in the third sensing area, and a second sensing extension wiring disposed in the third sensing area and connected between the second sensing wiring and the second resonant circuit.

The first sensing wiring may be connected between the first sensing coil and the first resonant circuit, and may include two or more bent portions disposed in the first sensing area.

The sensing coil component may further include groups of row sensing areas disposed in a row direction and groups of column sensing areas disposed in a column direction, wherein each of the groups of row sensing areas and the groups of column sensing areas includes a plurality of sensing areas, row sensing wirings disposed in the plurality of sensing areas of each of the groups of row sensing areas, column sensing wirings disposed in the plurality of sensing areas of each of the groups of column sensing areas, row sensing coils connected between a corresponding row sensing wiring of the row sensing wirings and a corresponding row resonant circuit, and column sensing coils connected between a corresponding column sensing wiring of the column sensing wirings and a corresponding column resonant circuit, wherein the first sensing area is a sensing area of the plurality of sensing areas, the first sensing wiring is a sensing wire of the row sensing wirings and column sensing wirings, and the first sensing coil is a sensing coil of the row sensing coils and column sensing coils.

The groups of row sensing areas disposed in a row direction and groups of column sensing areas disposed in a column direction may be disposed in a matrix structure.

In another general aspect, a switching operation sensing device includes a first inductor unit disposed on a coil substrate, wherein the first inductor unit includes a first sensing area disposed on the coil substrate, a first sensing wiring disposed in the first sensing area, and a first sensing coil connected between the first sensing wiring and a first resonant circuit of an oscillator circuit.

The switching operation sensing device may further include second and third inductor units disposed adjacent to the first inductor unit, wherein the second inductor unit may include a second sensing area, disposed adjacent to the first sensing area of the coil substrate, a second sensing wiring disposed in the second sensing area, and a second sensing coil connected between the second sensing wiring and a second resonant circuit of the oscillator circuit, and wherein the third inductor unit may include a third sensing area, disposed adjacent to the first sensing area of the coil substrate, a third sensing wiring disposed in the second sensing area, and a third sensing coil connected between the third sensing wiring and a third resonant circuit of the oscillator circuit.

The switching operation sensing device may further include a second inductor unit disposed adjacent to the first inductor unit, wherein the second inductor unit may include a second sensing area disposed adjacent to the first sensing area of the coil substrate, a second sensing wiring disposed in the second sensing area, a second sensing coil connected between the second sensing wiring and a second resonant circuit of the oscillator circuit, and a first sensing extension wiring disposed in the second sensing area, and connected between the first sensing wiring and the first resonant circuit.

The switching operation sensing device may further include a third inductor unit disposed adjacent to the second inductor unit, wherein the third inductor unit may include a third sensing area disposed adjacent to the second sensing area of the coil substrate, a third sensing wiring disposed in the third sensing area, a third sensing coil connected between the third sensing wiring and a third resonant circuit of the oscillator circuit, a first sensing extension wiring disposed in the third sensing area and connected between the first sensing wiring and the first resonant circuit, and a second sensing extension wiring disposed in the third sensing area and connected between the second sensing wiring and the second resonant circuit.

The switching operation sensing device may further include a third inductor unit disposed adjacent to the second inductor unit, wherein the third inductor unit may include a third sensing area disposed adjacent to the second sensing area of the coil substrate, and the first sensing extension wiring disposed in the third sensing area and connected between the first sensing wiring and the first resonant circuit.

The switching operation sensing device may further include a third inductor unit disposed between the first inductor unit and the second inductor unit, wherein the third inductor unit may include a third sensing area disposed adjacent to the second sensing area of the coil substrate, a first sensing extension wiring disposed in the third sensing area and connected between the first sensing wiring and the first resonant circuit, and a second sensing extension wiring disposed in the third sensing area and connected between the second sensing wiring and the second resonant circuit.

The switching operation sensing device may further include groups of row sensing areas disposed in a row direction and groups of column sensing areas disposed in a column direction, wherein each of the groups of row sensing areas and groups of column sensing areas comprises a plurality of sensing areas, row sensing wirings disposed in the plurality of sensing areas of each of the groups of row sensing areas, column sensing wirings disposed in the plurality of sensing areas of each of the groups of column sensing areas, row sensing coils connected between a corresponding row sensing wiring of the plurality of row sensing wirings and a corresponding row resonant circuit, and column sensing coils connected between a corresponding column sensing wiring of the column sensing wirings and a corresponding column resonant circuit, wherein the first sensing area is a sensing area of the plurality of sensing areas, the first sensing wiring is a sensing wire of the row sensing wirings and column sensing wirings, and the first sensing coil is a sensing coil of the row sensing coils and column sensing coils.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
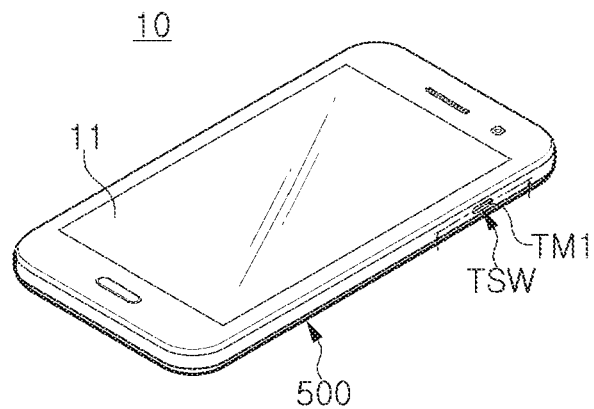
FIGS. 1A, 1B, and 1C are diagrams illustrating one or more examples of an exterior of a mobile device including one or more examples of a switching operation sensing device.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

An aspect of the present disclosure is to provide a sensing coil component which may improve the sensing of a touch operation and a switching operation sensing device including the same.

Figure 1B:
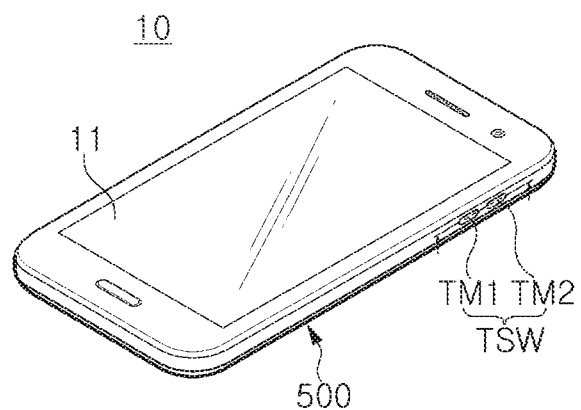
Figure 1C:
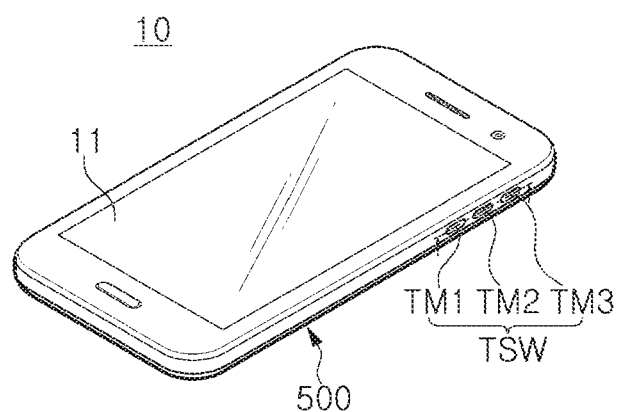

FIGS. 1A, 1B, and 1C are diagrams illustrating one or more examples of an exterior of a mobile device including one or more examples of a switching operation sensing device.

Referring to FIG. 1A, an example mobile device 10 to which the one or more examples of a switching operation sensing device is applied may include a touch screen 11, a housing 500, and a touch operation unit TSW including a first touch member TM1 to sense touch operation input.

Referring to FIG. 1B, an example mobile device 10 to which the one or more examples of a switching operation sensing device is applied may include a touch screen 11, a housing 500, and a touch operation unit TSW including first and second touch members TM1 and TM2 to sense touch operation input.

Referring to FIG. 1C, an example mobile device 10 to which the one or more examples of a switching operation sensing device is applied may include a touch screen 11, a housing 500, and a touch operation unit TSW including first, second, and third touch members TM1, TM2, and TM3 to sense touch operation input.

FIG. 1C illustrates the example in which the touch operation unit TSW includes the first, second, and third touch members TM1, TM2, and TM3, but the examples disclosed herein are not limited thereto. The touch members are not limited to the three touch members, the first, second, and third touch members, and the number of the touch members may be higher than the example illustrated in FIG. 1C.

As an example, referring to FIGS. 1A, 1B, and 1C, the mobile device 10 may be implemented by a portable device such as a smartphone, and may be implemented as a wearable device such as a smartwatch. However, the examples disclosed herein are not limited thereto, and the mobile device 10 may be implemented by another type of wearable or portable electrical device or an electrical device having a switch for operation control.

The housing 500 may be configured as an exterior case exposed externally on an electrical device. As an example, when the switching operation sensing device is applied to a mobile device, the housing 500 may be configured as a cover disposed on a side (a lateral surface) of the mobile device 10. As an example, the housing 500 may be integrated with a cover disposed on a rear surface of the mobile device 10, or may be separated from a cover disposed on the rear surface of the mobile device 10.

As described above, the housing 500 may be configured as an exterior case of an electrical device, and a position, a shape, and a structure of the housing 500 is not limited to the particular examples described herein.

Referring to FIG. 1C, the first, second, and third touch members TM1, TM2, and TM3 may be disposed in the housing 500, but the examples disclosed herein are not limited thereto.

The first, second, and third touch members TM1, TM2, and TM3 may be disposed on a cover of the mobile device. In this case, the cover may be configured as a cover other than a touch screen, a side cover, a rear cover, a cover formed on a portion of a front side, or the like, for example. As an example of the housing, the example in which the housing is disposed on a side cover of the mobile device will be described for ease of description, but the examples disclosed herein are not limited thereto.

In the diagrams, the unnecessary overlapping descriptions in relation to the same reference numeral and the same function will not be provided, and differences among the examples in the diagrams will mainly be described.

Figure 2:
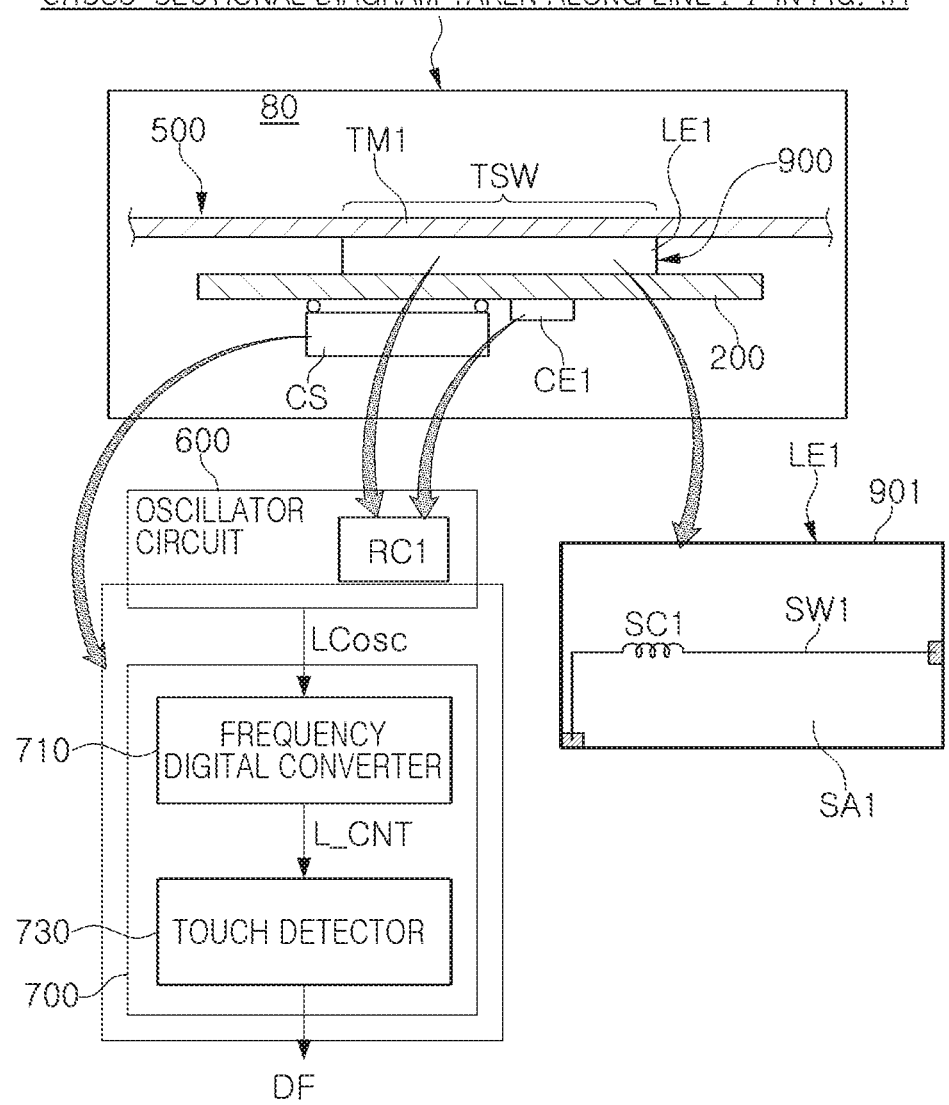
FIG. 2 is a cross-sectional diagram illustrating one or more examples of a switching operation sensing device taken along line I-I' in FIG. 1A.

FIG. 2 is a cross-sectional diagram illustrating one or more examples of a switching operation sensing device taken along line I-I' in FIG. 1A.

Referring to FIG. 2, a switching operation sensing device 80 may include a sensing coil component 900 and an oscillator circuit 600 to sense an operation input through a touch operation unit TSW integrated with a housing 500.

The switching operation sensing device 80 may further include a circuit for detecting a touch operation 700.

The touch operation unit TSW may include a first touch member TM1 integrated with the housing 500. The sensing coil component 900 may include at least a first inductor unit LE1 disposed in the first touch member TM1.

As an example, the first inductor unit LE1 may include a first sensing area SA1 opposing the first touch member TM1, a first sensing wiring SW1 disposed in the first sensing area SA1, and a first sensing coil SC1 connected between the first sensing wiring SW1 and a first resonant circuit RC1 (FIG. 3) of the oscillator circuit 600.

The oscillator circuit 600 may be connected to the sensing coil component 900, and may generate an oscillation signal LCosc having a resonant frequency that changes when a touch operation is input through the touch operation unit TSW. As an example, the oscillator circuit 600 may include a first resonant circuit RC1 connected to the first inductor unit LE1, and the first resonant circuit RC1 connected to the first inductor unit LE1 may be configured to form a resonance at a first resonant frequency, based on impedance that changes when a touch operation is input through the touch operation unit TSW.

In a wider sense, the oscillator circuit 600 configured to generate an oscillation signal having a resonant frequency may include the sensing coil component 900.

In the examples disclosed herein, the example in which the oscillator circuit 600 includes the sensing coil component 900 will be described, but the examples disclosed herein are not limited thereto.

The circuit for detecting a touch operation 700 may detect a touch operation using the oscillation signal LCosc received from the oscillator circuit 600 and may output a detection signal DF.

As an example, the sensing coil component 900 may be mounted on one surface of a substrate 200, and may be attached to an internal side of the housing 500. A circuit unit CS and a first capacitor device CE1 may be mounted on the other surface of the substrate 200 opposing the one surface, but the examples disclosed herein are not limited thereto. The circuit unit CS may include a portion (an amplifier circuit for oscillation) of the oscillator circuit 600 and the circuit for detecting a touch operation 700. The circuit unit CS may be configured as an integrated circuit (IC). For example, the circuit for detecting a touch operation 700 may include a frequency digital converter 710 and a touch detector 730.

The frequency digital converter 710 may convert the oscillation signal LCosc received from the oscillator circuit 600 into a count value L_CNT. As an example, the frequency digital converter 710 may count a clock signal using the oscillation signal LCosc and may generate the count value L_CNT. By using the above-described counting method, a clock signal of a low frequency may be able to be used.

The touch detector 730 may detect whether a touch operation is input based on the count value L_CNT received from the frequency digital converter 710 and may generate the detection signal DF.

Figure 3:
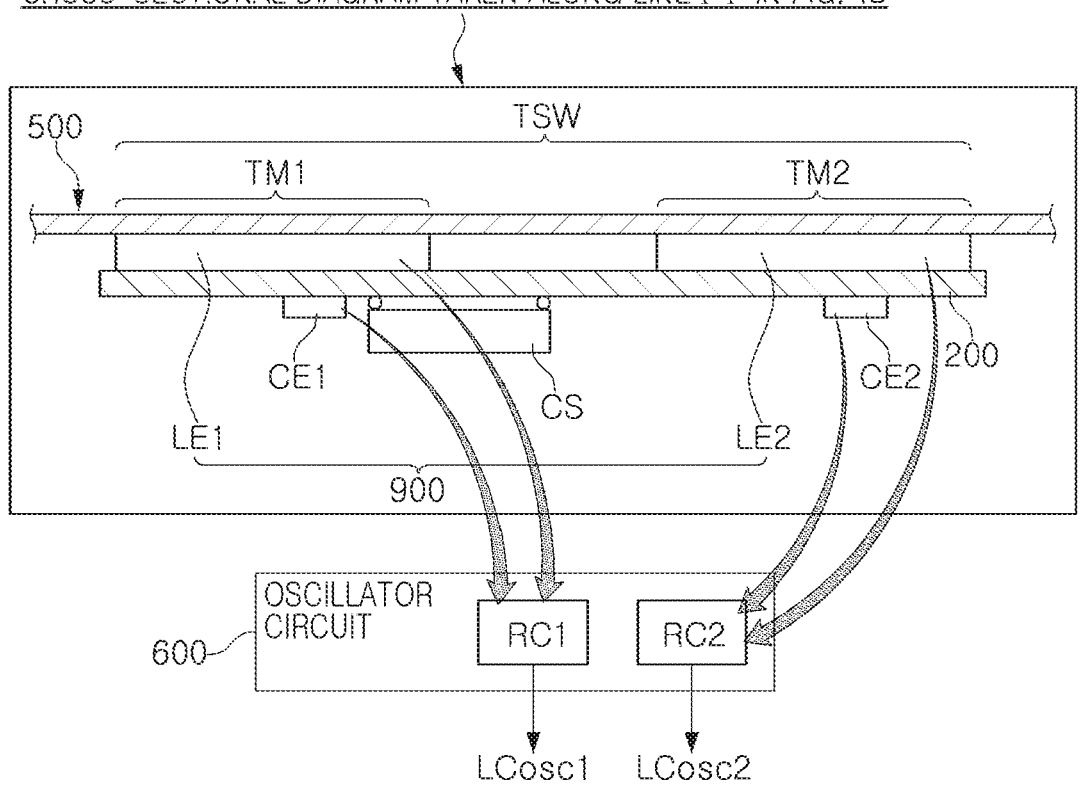
FIG. 3 is a cross-sectional diagram illustrating one or more examples of a switching operation sensing device taken along line I-I' in FIG. 1B.
Figure 4:
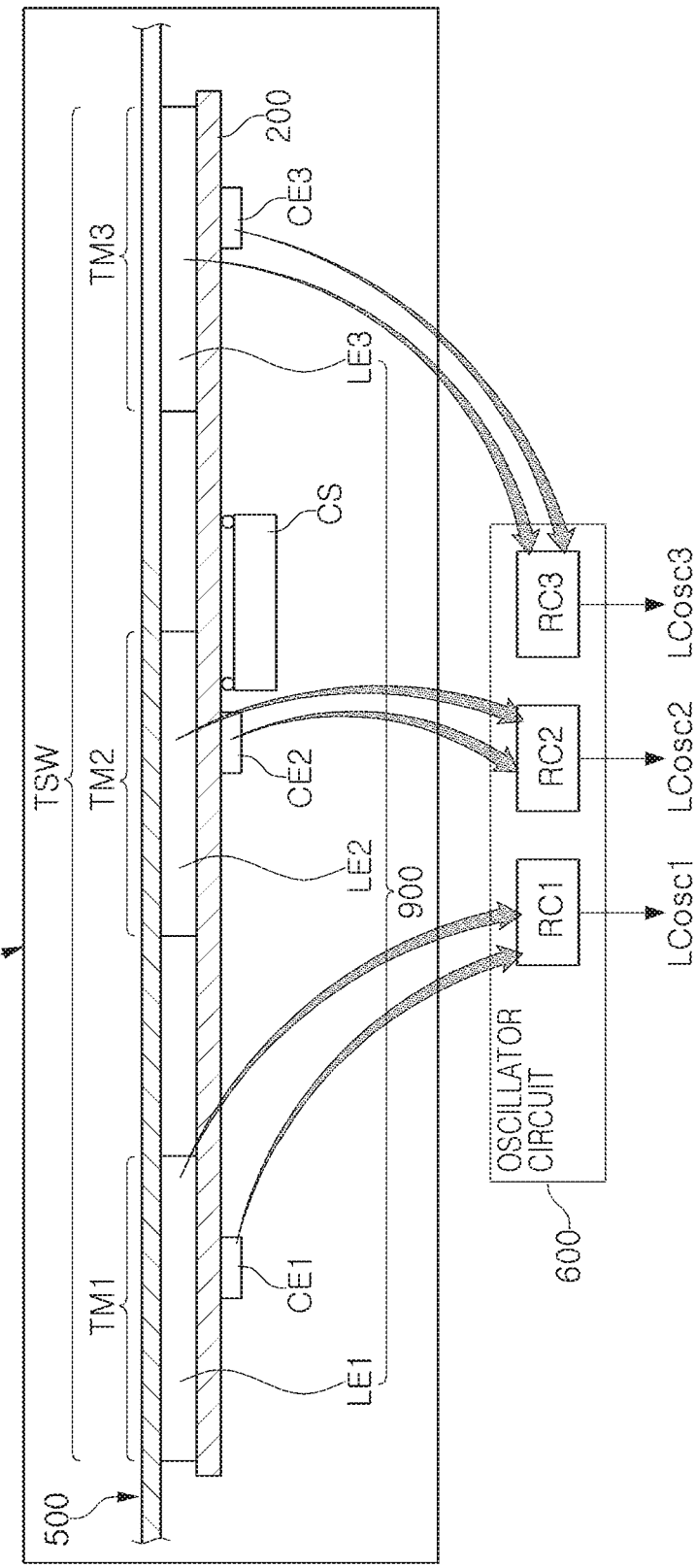
FIG. 4 is a cross-sectional diagram illustrating one or more examples of a switching operation sensing device taken along line I-I' in FIG. 1C.

FIG. 3 is a cross-sectional diagram illustrating one or more examples of a switching operation sensing device taken along line I-I' in FIG. 1B. FIG. 4 is a cross-sectional diagram illustrating one or more examples of a switching operation sensing device taken along line I-I' in FIG. 1C.

Referring to FIG. 3, the sensing coil component 900 may include a first inductor unit LE1 disposed in a first touch member TM1 and a second inductor unit LE2 disposed in a second touch member TM2.

As an example, the second inductor unit LE2 may include a second sensing area SA2 opposing the second touch member TM2 disposed in the housing 500, a second sensing wiring SW2 disposed in the second sensing area SA2, and a second sensing coil SC2 connected between the second sensing wiring SW2 and a second resonant circuit RC2 of an oscillator circuit 600.

The oscillator circuit 600 may include a first capacitor device CE1 and a second capacitor device CE2 mounted on the other surface of the substrate 200. A first resonant circuit RC1 may include the first inductor unit LE1 and the first capacitor device CE1, and the second resonant circuit RC2 may include the second inductor unit LE2 and the second capacitor device CE2.

The oscillator circuit 600 may generate a first oscillation signal LCosc1 having a first resonant frequency that changes when a touch operation is input through the first touch member TM1, and may generate a second oscillation signal LCosc2 having a second resonant frequency that changes when a touch operation is input through the second touch member TM2.

Referring to FIG. 4, the sensing coil component 900 may further include a third inductor unit LE3 disposed in the third touch member TM3, in addition to the first inductor unit LE1 and the second inductor unit LE2.

The third inductor unit LE3 may include a third sensing area SA3 opposing the third touch member TM3 disposed in the housing 500, a third sensing wiring SW3 disposed in the third sensing area SA3, and a third sensing coil SC3 connected between the third sensing wiring SW3 and a third resonant circuit RC3 of the oscillator circuit 600.

The oscillator circuit 600 may include a first capacitor device CE1, a second capacitor device CE2, and a third capacitor device CE3 mounted on the other side surface of the substrate 200. The first resonant circuit RC1 may include the first inductor unit LE1 and the first capacitor device CE1, the second resonant circuit RC2 may include the second inductor unit LE2 and the second capacitor device CE2, and the third resonant circuit RC3 may include the third inductor unit LE3 and the third capacitor device CE3.

The oscillator circuit 600 may generate a third oscillation signal LCosc3 having a third resonant frequency that changes when a touch operation is input through the third touch member TM3, in addition to the first oscillation signal LCosc1 and the second oscillation signal LCosc2 described with reference to FIG. 3 above.

Figure 5:
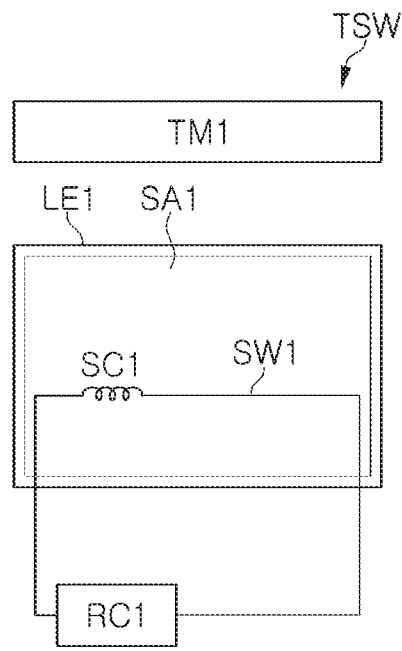
FIG. 5 is a diagram illustrating one or more examples of a sensing coil component illustrated in FIG. 2.

FIG. 5 is a diagram illustrating one or more examples of a sensing coil component illustrated in FIG. 2.

Referring to FIGS. 2 and 5, a first inductor unit LE1 may include a first sensing area SA1, a first sensing wiring SW1, and a first sensing coil SC1.

The first sensing area SA1 may be disposed on a coil substrate 901 and may oppose a first touch member TM1. As an example, the first sensing area SA1 may refer to an area for sensing a touch operation input through the first touch member TM1.

The first sensing wiring SW1 may be disposed in the first sensing area SA1 opposing the first touch member TM1.

The first sensing coil SC1 may be connected between the first sensing wiring SW1 and a first resonant circuit RC1 (FIG. 3) of the oscillator circuit 600. For example, the first sensing coil SC1 may be disposed externally or internally of the first sensing area SA1. As an example, FIG. 5 illustrates the first sensing coil SC1 disposed in the first sensing area SA1, but the examples disclosed herein are not limited thereto. The first sensing coil SC1 may be disposed on the coil substrate 901 disposed externally of the first sensing area SA1.

The first sensing wiring SW1 may be disposed in the first sensing area SA1 to sense at least a partial area of the first sensing area SA1 other than the area in which the first sensing coil SC1 is disposed when a touch operation of the first touch member TM1 is input, and as illustrated in FIG. 5, the first sensing wiring SW1 may connect the first sensing coil SC1 to the first resonant circuit RC1 of the oscillator circuit 600. As an example, the first sensing wiring SW1 may be configured to perform a sensing operation in an overall area of the first sensing area SA1 along with the first sensing coil SC1.

In a first example (FIG. 5), the first sensing coil SC1 may be disposed in the first sensing area SA1, and in a second example, the first sensing coil SC1 may be disposed externally of the first sensing area SA1. The present examples may be applied to the examples disclosed herein.

Figure 6:
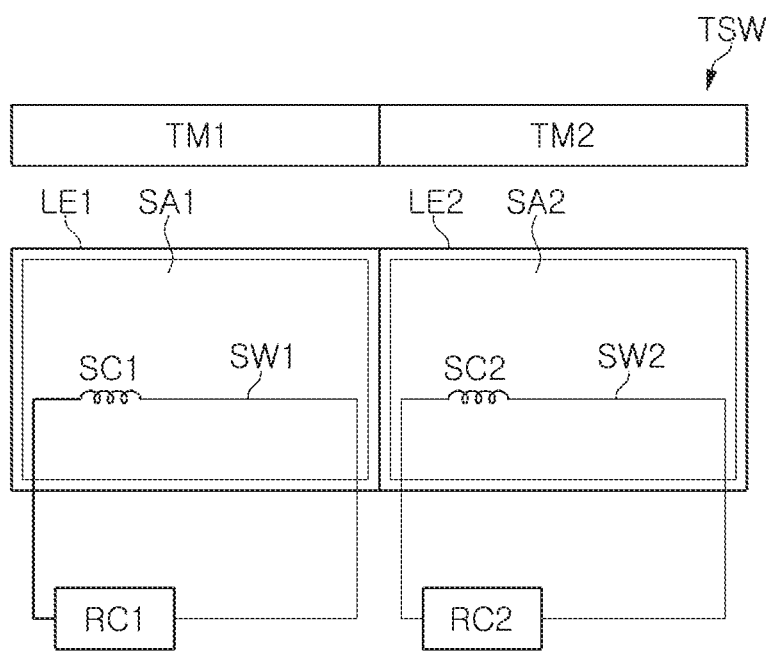
FIG. 6 is a diagram illustrating one or more examples of a sensing coil component illustrated in FIG. 3.

FIG. 6 is a diagram illustrating one or more examples of a sensing coil component illustrated in FIG. 3.

Referring to FIGS. 3 and 6, a touch operation unit TSW may further include a second touch member TM2 integrated with the housing 500 and disposed in a position different from a position of the first touch member TM1. The sensing coil component 900 of the switching operation sensing device may further include a second inductor unit LE2 disposed adjacent to the first inductor unit LE1.

The second inductor unit LE2 may include a second sensing area SA2, a second sensing wiring SW2, and a second sensing coil SC2.

The second sensing area SA2 may be disposed on the coil substrate 901 and may oppose the second touch member TM2. As an example, the second sensing area SA2 may refer to an area for sensing a touch operation input through the second touch member TM2.

The second sensing wiring SW2 may be disposed in the second sensing area SA2. The second sensing coil SC2 may be connected between the second sensing wiring SW2 and a second resonant circuit RC2 of the oscillator circuit 600. For example, the second sensing coil SC2 may be disposed externally or internally of the second sensing area SA2. As an example, FIG. 6 illustrates the second sensing coil SC2 disposed in the second sensing area SA2, but the examples disclosed herein are not limited thereto. The second sensing coil SC2 may be disposed on the coil substrate 901 disposed externally of the second sensing area SA2.

The second sensing wiring SW2 may be disposed in the second sensing area SA2 to sense at least a partial area of the second sensing area SA2 other than the area in which the second sensing coil SC2 is disposed when a touch operation of the second touch member TM2 is input, and as illustrated in FIG. 6, the second sensing wiring SW2 may connect the second sensing coil SC2 to the second resonant circuit RC2 of the oscillator circuit 600. As an example, the second sensing wiring SW2 may be configured to perform a sensing operation in an overall area of the second sensing area SA2 along with the second sensing coil SC2.

Figure 7:
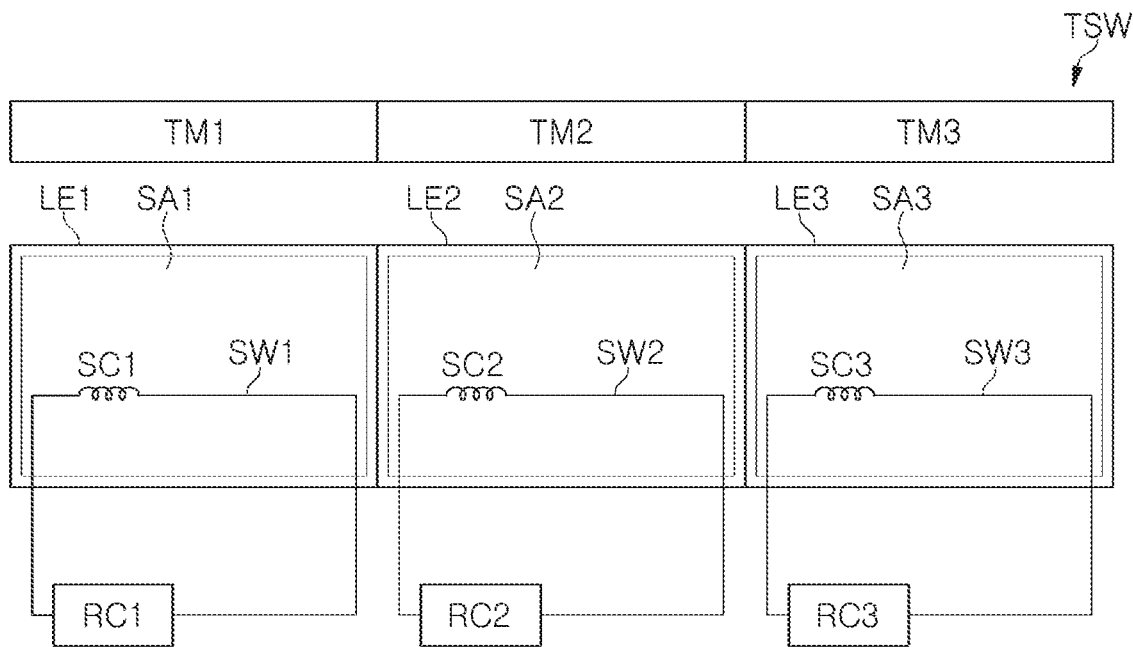
FIG. 7 is a diagram illustrating one or more examples of a sensing coil component illustrated in FIG. 4.

FIG. 7 is a diagram illustrating one or more examples of a sensing coil component illustrated in FIG. 4.

Referring to FIGS. 4 and 7, a touch operation unit TSW may further include a second touch member TM2 and a third touch member TM3 integrated with the housing 500 and disposed in positions different from each other and different from a position of the first touch member TM1.

A sensing coil component 900 may further include a third inductor unit LE3 in addition to a first inductor unit LE1 and a second inductor unit LE2 of the sensing coil component 900.

The third inductor unit LE3 may include a third sensing area SA3, a third sensing wiring SW3, and a third sensing coil SC3.

The third sensing area SA3 may be disposed on a coil substrate 901 and may oppose the third touch member TM3. As an example, the third sensing area SA3 may refer to an area for sensing a touch operation input through the third touch member TM3.

The third sensing wiring SW3 may be disposed in the third sensing area SA3.

The third sensing coil SC3 may be connected between the third sensing wiring SW3 and a third resonant circuit RC3 of the oscillator circuit 600. For example, the third sensing coil SC3 may be disposed externally or internally of the third sensing area SA3. As an example, FIG. 7 illustrates the third sensing coil SC3 disposed in the third sensing area SA3, but examples disclosed herein are not limited thereto. The third sensing coil SC3 may be disposed on the coil substrate 901 disposed externally of the third sensing area SA3.

The third sensing wiring SW3 may be disposed in the third sensing area SA3 to sense at least a partial area of the third sensing area SA3 other than the area in which the third sensing coil SC3 is disposed when a touch operation of the third touch member TM3 is input, and as illustrated in FIG. 7, the third sensing wiring SW3 may connect the third sensing coil SC3 to the third resonant circuit RC3 of the oscillator circuit 600. As an example, the third sensing wiring SW3 may be configured to perform a sensing operation in an overall area of the third sensing area SA3 along with the third sensing coil SC3.

As described above, by performing a touch operation to one or more of the first, second, and third touch members TM1, TM2, and TM3 illustrated in FIGS. 5, 6, and 7, an oscillation signal having a corresponding resonant frequency which changes may be generated, and the configuration may be applied to the examples disclosed herein.

Figure 8:
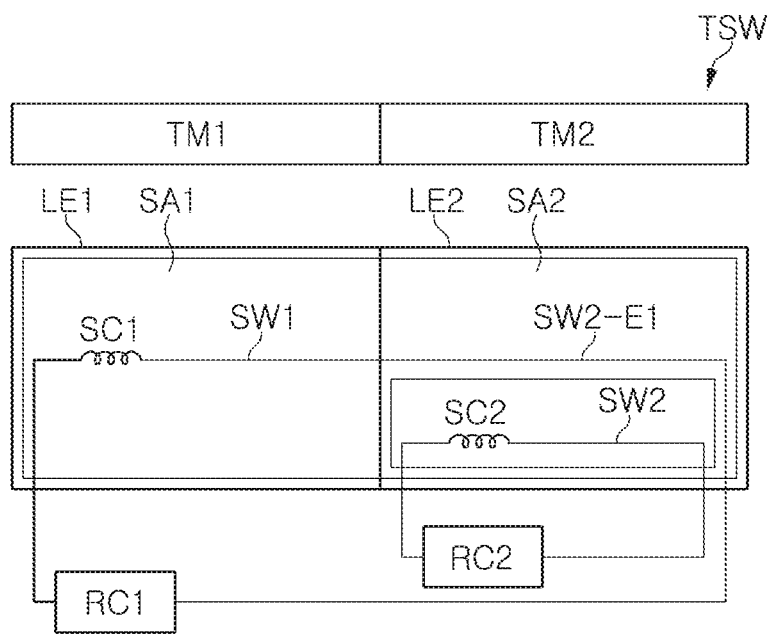
FIG. 8 is a diagram illustrating one or more modified examples of a sensing coil component illustrated in FIG. 3.

FIG. 8 is a diagram illustrating one or more modified examples of a sensing coil component illustrated in FIG. 3.

Referring to FIGS. 3 and 8, a touch operation unit TSW may further include a second touch member TM2 integrated with the housing 500 and disposed in a position different from a position of the first touch member TM1.

A sensing coil component 900 may further include a second inductor unit LE2, differently from the sensing coil component 900 illustrated in FIG. 5.

The second inductor unit LE2 may include a second sensing area SA2, a second sensing wiring SW2, a second sensing coil SC2, and a first sensing extension wiring SW2-E1.

The second sensing area SA2 may be disposed on the coil substrate 901 and may oppose the second touch member TM2. As an example, the second sensing area SA2 may refer to an area for sensing a touch operation input through the second sensing area SA2.

The second sensing wiring SW2 may be disposed in the second sensing area SA2.

The second sensing coil SC2 may be connected between the second sensing wiring SW2 and a second resonant circuit RC2 of the oscillator circuit 600. For example, the second sensing coil SC2 may be disposed externally or internally of the second sensing area SA2. As an example, FIG. 8 illustrates the second sensing coil SC2 disposed in the second sensing area SA2, but is the examples disclosed herein are not limited thereto. The second sensing coil SC2 may be disposed on the coil substrate 901 disposed externally of the second sensing area SA2.

The second sensing wiring SW2 may be disposed in the second sensing area SA2 to sense at least a partial area of the second sensing area SA2 other than the area in which the second sensing coil SC2 is disposed when a touch operation of the second touch member TM2 is input, and the second sensing wiring SW2 may connect the second sensing coil SC2 to the second resonant circuit RC2 of the oscillator circuit 600. As an example, the second sensing wiring SW2 may be configured to perform a sensing operation in an overall area of the second sensing area SA2 along with the second sensing coil SC2.

The first sensing extension wiring SW2-E1 may be disposed in the second sensing area SA2 to sense at least a partial area of the second sensing area SA2 other than the area in which the second sensing coil SC2 is disposed when a touch operation of the second touch member TM2 is input, and the first sensing wiring SW1 may connect the first sensing extension wiring SW2-E1 to the first sensing coil SC1. The first sensing extension wiring SW2-E1 may connect the first sensing wiring SW1 to the first resonant circuit RC1.

Figure 9:
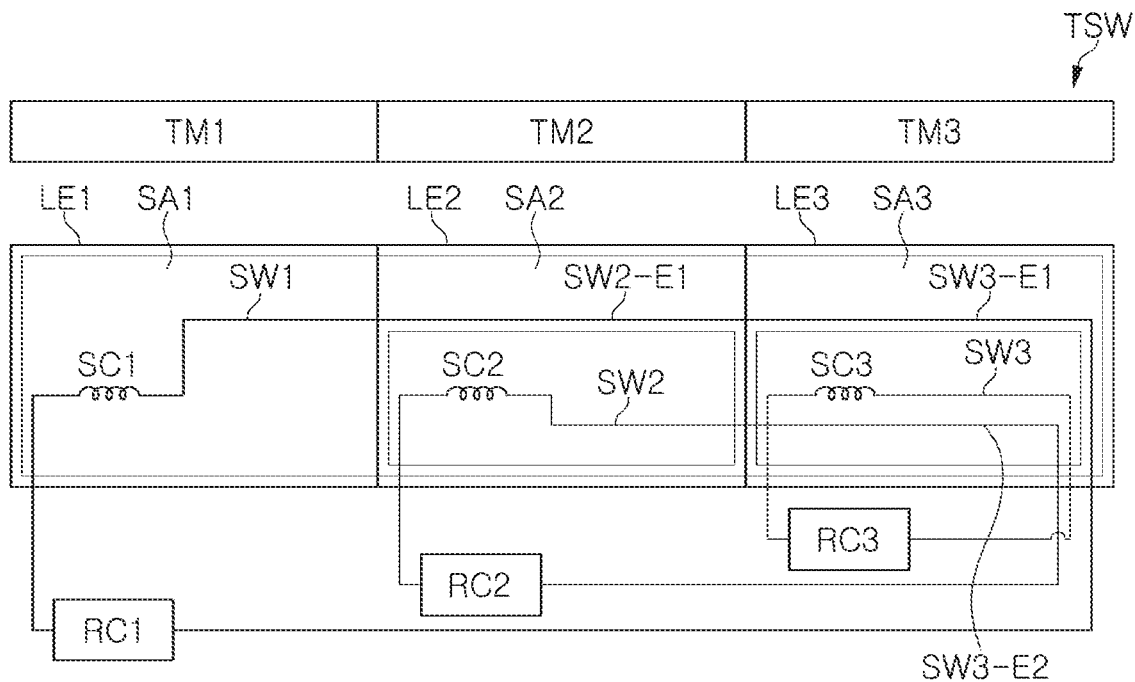
FIG. 9 is a diagram illustrating one or more modified examples of a sensing coil component illustrated in FIG. 4.

FIG. 9 is a diagram illustrating one or more modified examples of a sensing coil component illustrated in FIG. 4.

Referring to FIGS. 4 and 9, the touch operation unit TSW may further include the third touch member TM3 integrated with the housing 500 and disposed in a position different from a position of the first touch member TM1 and the second touch member TM2.

A sensing coil component 900 may further include a third inductor unit LE3 disposed adjacent to a second inductor unit LE2, differently from the sensing coil component 900 illustrated in FIG. 8.

The third inductor unit LE3 may include a third sensing area SA3, a third sensing wiring SW3, a third sensing coil SC3, a first sensing extension wiring SW2-E1, and a second sensing extension wiring SW2-E2.

The third sensing area SA3 may correspond to a third touch member TM3 of a coil substrate 901. As an example, the third sensing area SA3 may refer to an area for sensing a touch operation input through the third touch member TM3.

The third sensing wiring SW3 may be disposed in the third sensing area SA3.

The third sensing coil SC3 may be connected between the third sensing wiring SW3 and a third resonant circuit RC3 of the oscillator circuit 600. For example, the third sensing coil SC3 may be disposed externally or internally of the third sensing area SA3. As an example, FIG. 9 illustrates the third sensing coil SC3 disposed in the third sensing area SA3, but examples disclosed herein are not limited thereto. The third sensing coil SC3 may be disposed on the coil substrate 901 disposed externally of the third sensing area SA3.

The third sensing wiring SW3 may be disposed in the third sensing area SA3 to sense at least a partial area of the third sensing area SA3 other than the area in which the third sensing coil SC3 is disposed when a touch operation of the third touch member TM3 is input, and the third sensing wiring SW3 may be connected to the third sensing coil SC3 and the third resonant circuit RC3 of the oscillator circuit 600. As an example, the third sensing wiring SW3 may be configured to perform a sensing operation in at least the partial area of the third sensing area SA3 other than the area in which the third sensing coil SC3 is disposed.

The first sensing extension wiring SW3-E1 may be disposed in the third sensing area SA3, and may connect a first sensing wiring SW1 to a first resonant circuit RC1. For example, the first sensing extension wiring SW3-E1 disposed in the third sensing area SA3, may connect the first sensing extension wiring SW2-E1 disposed in the second sensing area SA2 and the first sensing wiring SW1 to the first resonant circuit RC1. The second sensing extension wiring SW3-E2 may be disposed in the third sensing area SA3, and a second sensing wiring SW2 may connect the second sensing extension wiring SW3-E2 to a second sensing coil SC2. The second sensing extension wiring SW3-E2 may connect the second sensing wiring SW2 to a second resonant circuit RC2.

Figure 10:
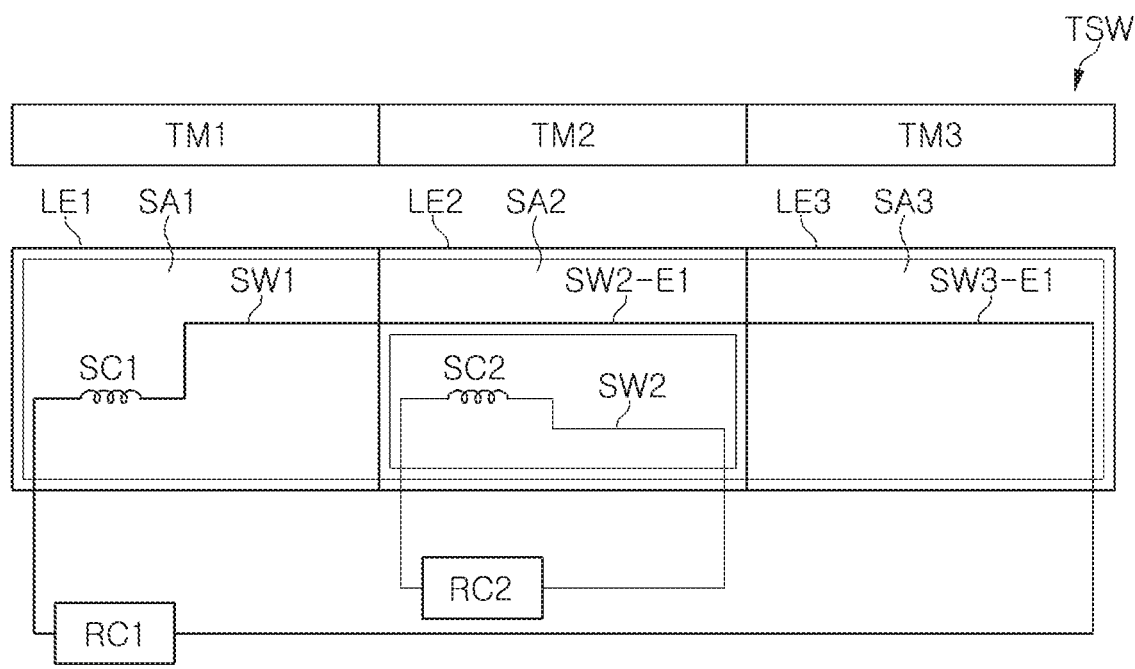
FIG. 10 is a diagram illustrating one or more other modified examples of a sensing coil component illustrated in FIG. 4.

FIG. 10 is a diagram illustrating one or more other modified examples of a sensing coil component illustrated in FIG. 4.

Referring to FIGS. 4 and 10, the touch operation unit TSW may further include a third touch member TM3 integrated with the housing 500 and disposed in a position different from a position of the first touch member TM1 and different from a position of the second touch member TM2.

The sensing coil component 900 may further include a third inductor unit LE3 disposed adjacent to the second inductor unit LE2, differently from the sensing coil component 900 illustrated in FIG. 8.

The third inductor unit LE3 may include a third sensing area SA3 and a first sensing extension wiring SW3-E1.

The third sensing area SA3 may be disposed on a coil substrate 901 and may oppose the third touch member TM3. As an example, the third sensing area SA3 may refer to an area for sensing a touch operation input through the third touch member TM3.

The first sensing extension wiring SW3-E1 may be disposed in the third sensing area SA3, and may connect a first sensing wiring SW1 to a first resonant circuit RC1.

Figure 11:
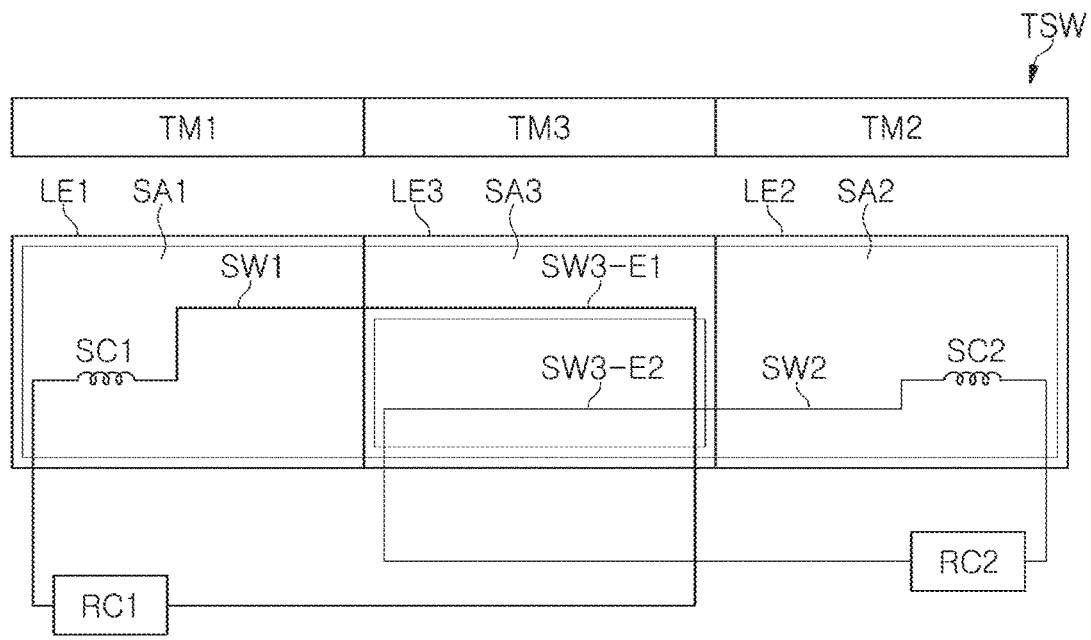
FIG. 11 is a diagram illustrating one or more other modified examples of a sensing coil component illustrated in FIG. 4.

FIG. 11 is a diagram illustrating one or more other modified examples of a sensing coil component illustrated in FIG. 4.

Referring to FIGS. 4 and 11, the touch operation unit TSW may further include a third touch member TM3 integrated with the housing 500 and disposed between the first touch member TM1 and the second touch member TM2.

The sensing coil component 900 may further include a third inductor unit LE3 disposed between the first inductor unit LE1 and the second inductor unit LE2 of the sensing coil component 900 illustrated in FIG. 8.

The third inductor unit LE3 may include a third sensing area SA3, a first sensing extension wiring SW3-E1, and a second sensing extension wiring SW3-E2.

The third sensing area SA3 may be disposed on a coil substrate 901 and may oppose the third touch member TM3. As an example, the third sensing area SA3 may refer to an area for sensing a touch operation input through the third touch member TM3.

The first sensing extension wiring SW3-E1 may be disposed in the third sensing area SA3, and may connect a first sensing wiring SW1 to a first resonant circuit RC1. The second sensing extension wiring SW3-E2 may be disposed in the third sensing area SA3, and may connect a second sensing wiring SW2 to a second resonant circuit RC2. The second sensing wiring SW2 may connect the second sensing extension wiring SW3-E2 to a second sensing coil SC2.

Figure 12:
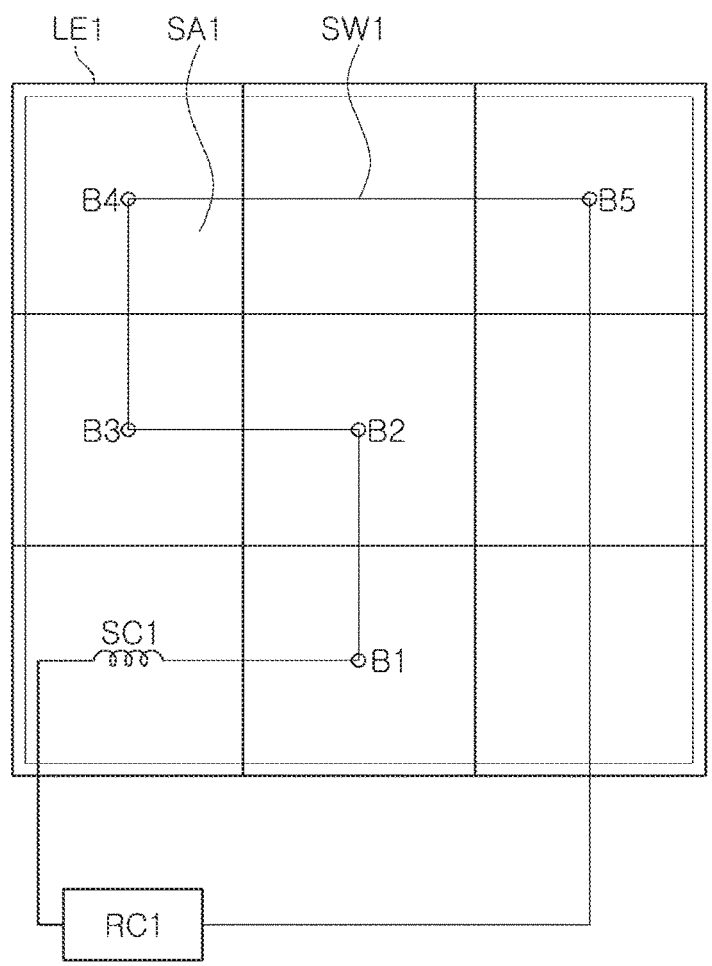
FIG. 12 is a diagram illustrating one or more modified examples of a sensing coil component illustrated in FIG. 5.

FIG. 12 is a diagram illustrating one or more modified examples of a sensing coil component illustrated in FIG. 5.

Referring to FIGS. 5 and 12, the first sensing wiring SW1 may be disposed in the first sensing area SA1, and may connect the first sensing coil SC1 to the first resonant circuit RC1, similarly to the first sensing wiring SW1 illustrated in FIG. 5.

Similarly to the first sensing wiring SW1 illustrated in FIG. 5, the first sensing wiring SW1 in FIG. 12 may include bent portions B1 to B5 configured to be bent two or more times in different directions. As an example, the first sensing wiring SW1 may be configured to perform a sensing operation in an overall area of the first sensing area SA1. In the example embodiment, the bent portions B1 to B5 may refer to bent portions bent in different directions, and an angle of each of the bent portions may be an acute angle, a right angle, or an obtuse angle. Alternatively, the bent portions may be configured to be curved without forming a particular angle.

Figure 13:
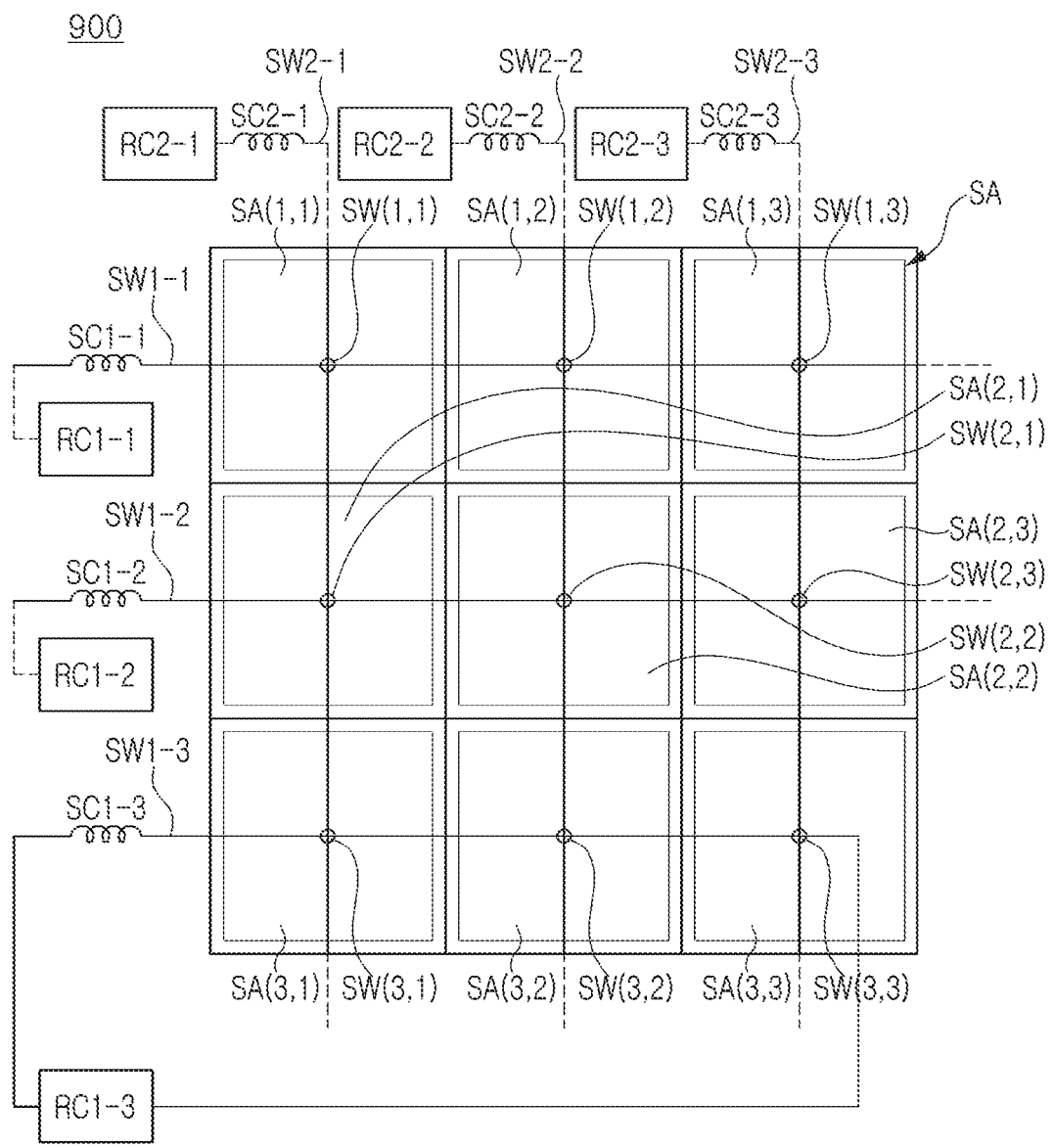
FIG. 13 is a diagram illustrating one or more other examples of a sensing coil component.

FIG. 13 is a diagram illustrating one or more other examples of a sensing coil component.

Referring to FIG. 13, a sensing coil component 900 may include a sensing area portion SA, a plurality of row sensing coils SC1-1, SC1-2, and SC1-3, a plurality of column sensing coils SC2-1, SC2-2, and SC2-3, a plurality of row sensing wirings SW1-1, SW1-2, and SW1-3, and a plurality of column sensing wirings SW2-1, SW2-2, and SW2-3.

The sensing coil component 900 illustrated in FIG. 13 may have a sensing structure configured as a 3×3 matrix structure, but the examples disclosed herein are not limited thereto. For example, the matrix structure may further extend in rows and/or columns, or in other examples, the matrix structure may include less rows and/or columns.

The sensing coil component 900 having a 3×3 matrix structure will be described with reference to FIG. 13. The sensing area portion SA of the sensing coil component 900 may include a group of first row sensing areas (SA(1,K), K=1, 2, 3) including the first sensing area SA(1,1), a group of second row sensing areas (SA(2,K), K=1, 2, 3), and a group of third row sensing areas, (SA(3,K), K=1, 2, 3), disposed in a row direction and a group of first column sensing areas (SA(K,1), K=1, 2, 3) including the first sensing area SA(1,1), a group of second column sensing areas (SA(K,2), K=1, 2, 3), and a group of third column sensing areas (SA(K,3), K=1, 2, 3), disposed in a column direction such that the sensing coil component 900 may have a matrix structure.

As an example, a group of the first row sensing areas (SA(1,K), K=1, 2, 3) may include the first, second, and third sensing areas (SA(1,1), SA(1,2), SA(1,3)), a group of the second row sensing areas (SA(2,K), K=1, 2, 3) may include first, second, and third sensing areas (SA(2,1), SA(2,2), SA(2,3)), and a group of the third row sensing areas (SA(3,K), K=1, 2, 3) may include first, second, and third sensing areas (SA(3,1), SA(3,2), SA(3,3)).

As an example, a group of the first column sensing areas (SA(K,1), K=1, 2, 3) may include first, second, and third sensing areas (SA(1,1), SA(2,1), SA(3,1)), a group of the second column sensing areas (SA(K,2), K=1, 2, 3) may include first, second, and third sensing areas (SA(1,2), SA(2,2), SA(3,2)), and a group of third column sensing areas (SA(K,3), K=1, 2, 3) may include first, second, and third sensing areas (SA(1,3), SA(2,3), SA(3,3)).

The sensing coil component 900 may include first, second, and third row sensing wirings SW1-1, SW1-2, and SW1-3.

The first row sensing wiring SW1-1 may be disposed in the group of the first row sensing areas (SA(1,K), K=1, 2, 3), the second row sensing wiring SW1-2 may be disposed in the group of the second row sensing areas (SA(2,K), K=1, 2, 3), and the third row sensing wiring SW1-3 may be disposed in the group of the third row sensing areas (SA(3, K), K=1, 2, 3).

The sensing coil component 900 may include first, second, and third column sensing wirings SW2-1, SW2-2, and SW2-3.

The first column sensing wiring SW2-1 may be disposed in the group of the first column sensing areas (SA(K,1), K=1, 2, 3), the second column sensing wiring SW2-2 may be disposed in the group of the second column sensing areas (SA(K,2), K=1, 2, 3), and the third column sensing wiring SW2-3 may be disposed in the group of third column sensing areas (SA(K,3), K=1, 2, 3).

As an example, the sensing coil component 900 may include first, second, and third row sensing coils SC1-1, SC1-2, and SC1-3.

The first row sensing coil SC1-1 may be connected between the first row sensing wiring SW1-1 and a first row resonant circuit RC1-1 of the oscillator circuit 600, the second row sensing coil SC1-2 may be connected between the second row sensing wiring SW1-2 and a second row resonant circuit RC1-2 of the oscillator circuit 600, and the third row sensing coil SC1-3 may be connected between the third row sensing wiring SW1-3 and a third row resonant circuit RC1-3 of the oscillator circuit 600.

As an example, the sensing coil component 900 may include first, second, and third column sensing coils SC2-1, SC2-2, and SC2-3.

The first column sensing coil SC2-1 may be connected between the first column sensing wiring SW2-1 and a first column resonant circuit RC2-1 of the oscillator circuit 600, the second column sensing coil SC2-2 may be connected between the second column sensing wiring SW2-2 and a second column resonant circuit RC2-2 of the oscillator circuit 600, and the third column sensing coil SC2-3 may be connected between the third column sensing wiring SW2-3 and a third resonant circuit RC2-3 of the oscillator circuit 600.

Each of the sensing areas (SA(i,j), i=1, 2, 3, j=1, 2, 3) described above may include a point at which a corresponding row sensing wiring (SW1-$i$, i=1, 2, 3) and column sensing wiring (SW2-$j$, j=1, 2, 3) intersect with each other, and the sensing wirings may be disposed such that the intersecting points (SW(i,j), i=1, 2, 3, j=1, 2, 3) may not be electrically connected to each other but may overlap upwardly and downwardly. For example, first row sensing wire SW1-1 and first column sensing wire SW2-1 may overlap upwardly and downwardly at the intersecting point SW(1,1) in first sensing area SA(1,1), first row sensing wire SW1-1 and second column sensing wire SW2-2 may overlap upwardly and downwardly at the intersecting point SW(1,2) in second sensing area SA(1,2), etc.

Figure 14:
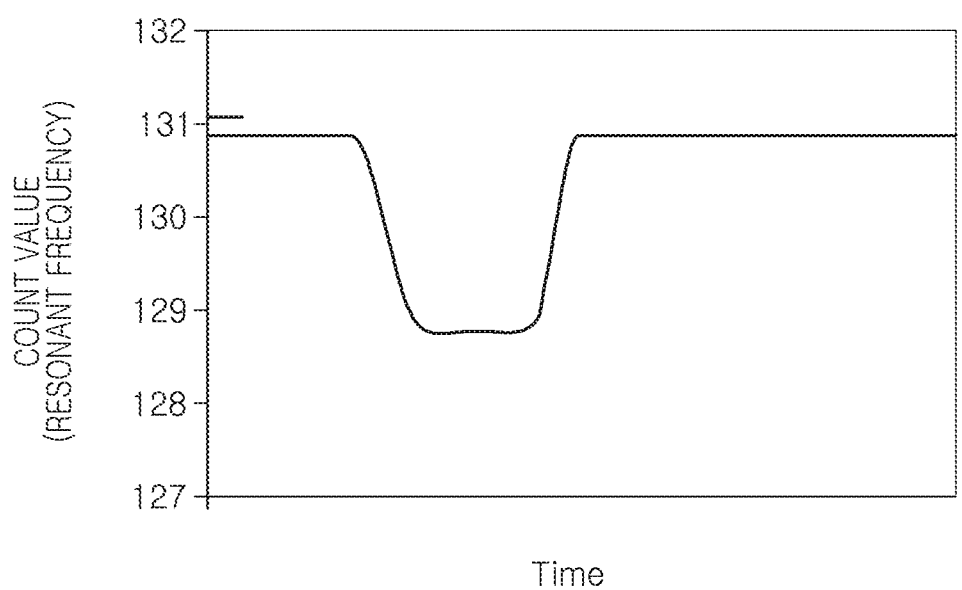
FIG. 14 is a diagram illustrating one or more examples of a count value.

FIG. 14 is a diagram illustrating one or more examples of a count value.

Referring to FIG. 14, an oscillator circuit 600 may be configured to generate an oscillation signal LCosc having a resonant frequency that changes when a touch operation is input through a touch operation unit TSW. A frequency digital converter 710 of a circuit for detecting a touch operation 700 may convert the oscillation signal LCosc received from the oscillator circuit 600 into a count value L_CNT.

As an example, when a touch operation is input through the touch operation unit TSW, capacitance may increase such that the oscillation signal LCosc having a decreased resonant frequency may be generated.

When a resonant frequency decreases, the count value L_CNT may also decrease, and a touch operation may be detected based on the decreased count value.

According to the examples described herein, by disposing a wiring for a sensing operation to sense an area in which a sensing device (e.g., a sensing coil) is not disposed, a size of the sensing device may be reduced, and the number of sensing devices may be reduced such that a sensing component may have a reduced size, and a sensing area may be expanded without increasing a size.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A switching operation sensing device to be applied to an electronic device comprising a touch operation unit comprising a first touch member disposed in a housing, the switching operation sensing device comprising:
 a sensing coil component comprising a first inductor unit disposed on an inner surface of the first touch member; and
 an oscillator circuit connected to the sensing coil component and configured to generate an oscillation signal comprising a resonant frequency that changes when a touch operation is input through the touch operation unit,
 wherein the first inductor unit comprises:
 a first sensing area opposing the first touch member;
 a first sensing wiring disposed in the first sensing area; and
 a first sensing coil connected between the first sensing wiring and a first resonant circuit of the oscillator circuit;
 wherein the first sensing wiring senses at least a partial area of the first sensing area other than an area in which the first sensing coil is disposed.

2. The switching operation sensing device of claim 1, wherein the sensing coil component further comprises second and third inductor units disposed adjacent to the first inductor unit,
 wherein the second inductor unit comprises:
 a second sensing area opposing a second touch member disposed in the housing;
 a second sensing wiring disposed in the second sensing area; and
 a second sensing coil connected between the second sensing wiring and a second resonant circuit of the oscillator circuit, and
 wherein the third inductor unit comprises:
 a third sensing area opposing a third touch member disposed in a different position of the housing from the second sensing area;
 a third sensing wiring disposed in the third sensing area; and
 a third sensing coil connected between the third sensing wiring and a third resonant circuit of the oscillator circuit.

3. The switching operation sensing device of claim 1, wherein the sensing coil component further comprises a second inductor unit disposed adjacent to the first inductor unit, and
 wherein the second inductor unit comprises:
 a second sensing area opposing a second touch member disposed in the housing;
 a second sensing wiring disposed in the second sensing area;
 a second sensing coil connected between the second sensing wiring and a second resonant circuit of the oscillator circuit; and
 a first sensing extension wiring disposed in the second sensing area, and connected between the first sensing wiring and the first resonant circuit.

4. The switching operation sensing device of claim 3,
wherein the sensing coil component further comprises a
third inductor unit disposed adjacent to the second
inductor unit, and
wherein the third inductor unit comprises:
a third sensing area opposing a third touch member disposed in the housing;
a third sensing wiring disposed in the third sensing area;
a third sensing coil connected between the third sensing wiring and a third resonant circuit of the oscillator circuit;
the first sensing extension wiring disposed in the third sensing area and connected between the first sensing wiring and the first resonant circuit; and
a second sensing extension wiring disposed in the third sensing area and connected between the second sensing wiring and the second resonant circuit.

5. The switching operation sensing device of claim 3,
wherein the sensing coil component further comprises a
third inductor unit disposed adjacent to the second
inductor unit, and
wherein the third inductor unit comprises:
a third sensing area opposing a third touch member disposed in the housing; and
the first sensing extension wiring disposed in the third sensing area and connected between the first sensing wiring and the first resonant circuit.

6. The switching operation sensing device of claim 3,
wherein the sensing coil component further comprises a
third inductor unit disposed between the first inductor
unit and the second inductor unit, and
wherein the third inductor unit comprises:
a third sensing area opposing a third touch member disposed in the housing;
the first sensing extension wiring disposed in the third sensing area and connected between the first sensing wiring and the first resonant circuit; and
a second sensing extension wiring disposed in the third sensing area and connected between the second sensing wiring and the second resonant circuit.

7. The switching operation sensing device of claim 1,
wherein the first sensing wiring is connected between the
first sensing coil and the first resonant circuit, and comprises
two or more bent portions disposed in the first sensing area.

8. The switching operation sensing device of claim 1,
wherein the sensing coil component further comprises:
groups of row sensing areas disposed in a row direction and groups of column sensing areas disposed in a column direction, wherein each of the groups of row sensing areas and the groups of column sensing areas comprises a plurality of sensing areas;
row sensing wirings disposed in the plurality of sensing areas of each of the groups of row sensing areas;
column sensing wirings disposed in the plurality of sensing areas of each of the groups of column sensing areas;
row sensing coils connected between a corresponding row sensing wiring of the row sensing wirings and a corresponding row resonant circuit; and
column sensing coils connected between a corresponding column sensing wiring of the column sensing wirings and a corresponding column resonant circuit,
wherein the first sensing area is a sensing area of the plurality of sensing areas, the first sensing wiring is a sensing wire of the row sensing wirings and column sensing wirings, and the first sensing coil is a sensing coil of the row sensing coils and column sensing coils.

9. The switching operation sensing device of claim 8,
wherein the groups of row sensing areas disposed in a row
direction and groups of column sensing areas disposed in a
column direction are disposed in a matrix structure.

10. A switching operation sensing device, comprising:
a first inductor unit disposed on a coil substrate,
wherein the first inductor unit comprises:
a first sensing area disposed on the coil substrate;
a first sensing wiring disposed in the first sensing area; and
a first sensing coil connected between the first sensing wiring and a first resonant circuit of an oscillator circuit,
wherein the first sensing wiring senses at least a partial area of the first sensing area other than an area in which the first sensing coil is disposed.

11. The switching operation sensing device of claim 10,
wherein the sensing coil component further comprises second and third inductor units disposed adjacent to the first
inductor unit, and
wherein the second inductor unit comprises:
a second sensing area, disposed adjacent to the first sensing area of the coil substrate;
a second sensing wiring disposed in the second sensing area; and
a second sensing coil connected between the second sensing wiring and a second resonant circuit of the oscillator circuit, and
wherein the third inductor unit comprises:
a third sensing area, disposed adjacent to the first sensing area of the coil substrate;
a third sensing wiring disposed in the second sensing area; and
a third sensing coil connected between the third sensing wiring and a third resonant circuit of the oscillator circuit.

12. The switching operation sensing device of claim 10,
wherein the sensing coil component further comprises a
second inductor unit disposed adjacent to the first inductor
unit, and
wherein the second inductor unit comprises:
a second sensing area disposed adjacent to the first sensing area of the coil substrate;
a second sensing wiring disposed in the second sensing area;
a second sensing coil connected between the second sensing wiring and a second resonant circuit of the oscillator circuit; and
a first sensing extension wiring disposed in the second sensing area, and connected between the first sensing wiring and the first resonant circuit.

13. The switching operation sensing device of claim 12,
wherein the sensing coil component further comprises a
third inductor unit disposed adjacent to the second inductor
unit,
wherein the third inductor unit comprises:
a third sensing area disposed adjacent to the second sensing area of the coil substrate;
a third sensing wiring disposed in the third sensing area;
a third sensing coil connected between the third sensing wiring and a third resonant circuit of the oscillator circuit;
a first sensing extension wiring disposed in the third sensing area and connected between the first sensing wiring and the first resonant circuit; and a second sensing extension wiring disposed in the third sensing area and connected between the second sensing wiring and the second resonant circuit.

14. The switching operation sensing device of claim 12, wherein the sensing coil component further comprises a third inductor unit disposed adjacent to the second inductor unit, wherein the third inductor unit comprises:
- a third sensing area disposed adjacent to the second sensing area of the coil substrate; and
- the first sensing extension wiring disposed in the third sensing area and connected between the first sensing wiring and the first resonant circuit.

15. The switching operation sensing device of claim 12, wherein the sensing coil component further comprises a third inductor unit disposed between the first inductor unit and the second inductor unit, and wherein the third inductor unit comprises:
- a third sensing area disposed adjacent to the second sensing area of the coil substrate;
- a first sensing extension wiring disposed in the third sensing area and connected between the first sensing wiring and the first resonant circuit; and
- a second sensing extension wiring disposed in the third sensing area and connected between the second sensing wiring and the second resonant circuit.

16. The switching operation sensing device of claim 10, wherein the first sensing wiring is connected between the first sensing coil and the first resonant circuit, and comprises two or more bent portions disposed in the first sensing area.

17. The switching operation sensing device of claim 10, further comprising:
- groups of row sensing areas disposed in a row direction and groups of column sensing areas disposed in a column direction, wherein each of the groups of row sensing areas and groups of column sensing areas comprises a plurality of sensing areas;
- row sensing wirings disposed in the plurality of sensing areas of each of the groups of row sensing areas;
- column sensing wirings disposed in the plurality of sensing areas of each of the groups of column sensing areas;
- row sensing coils connected between a corresponding row sensing wiring of the plurality of row sensing wirings and a corresponding row resonant circuit; and
- column sensing coils connected between a corresponding column sensing wiring of the column sensing wirings and a corresponding column resonant circuit, wherein the first sensing area is a sensing area of the plurality of sensing areas, the first sensing wiring is a sensing wire of the row sensing wirings and column sensing wirings, and the first sensing coil is a sensing coil of the row sensing coils and column sensing coils.

18. The switching operation sensing device of claim 17, wherein the groups of row sensing areas disposed in a row direction and groups of column sensing areas disposed in a column direction are disposed in a matrix structure.

* * * * *